United States Patent
Nagai et al.

(10) Patent No.: US 8,777,467 B2
(45) Date of Patent: Jul. 15, 2014

(54) VEHICLE INTERIOR LIGHTING SYSTEM

(75) Inventors: Kentaro Nagai, Shizuoka-ken (JP); Hiroyuki Suzuki, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 37 days.

(21) Appl. No.: 12/330,078

(22) Filed: Dec. 8, 2008

(65) Prior Publication Data
US 2009/0154183 A1    Jun. 18, 2009

(30) Foreign Application Priority Data
Dec. 14, 2007   (JP) ................ P2007-323218

(51) Int. Cl.
*B60Q 3/02* (2006.01)

(52) U.S. Cl.
USPC ............ 362/490; 362/800; 362/511; 362/522

(58) Field of Classification Search
USPC ......... 362/490, 471, 479, 488, 511, 522, 555, 362/579, 551, 249.01, 249.02, 249.14; 385/133
See application file for complete search history.

(56) References Cited

U.S. PATENT DOCUMENTS

2006/0279959 A1 *   12/2006   Yabashi et al. ................ 362/490

FOREIGN PATENT DOCUMENTS

| JP | 07099345 A | * | 4/1995 |
|----|------------|---|--------|
| JP | 2003-175765 | | 6/2003 |
| JP | 2006-04567 | | 2/2006 |
| JP | 2006-232092 | | 9/2006 |
| JP | 2006-007856 | | 12/2006 |

OTHER PUBLICATIONS

Machine Translation of JP2006-007856A.*
Japanese Patent Office, Office Action in Application No. 2007-323218, mailed Jul. 24, 2012, 2 pages.
Japanese Patent Office, Office Action in Application No. 2007-323218, Issued Jan. 17, 2012, 3 pages.
German Patent Office, Official Action in application 10 2008 062 051.3, mailed Aug. 30, 2013, 14 pages.

* cited by examiner

*Primary Examiner* — Jong-Suk (James) Lee
*Assistant Examiner* — Leah S Macchiarolo
(74) *Attorney, Agent, or Firm* — Finnegan, Henderson, Farabow, Garrett & Dunner, L.L.P.

(57) ABSTRACT

A vehicle interior lighting system includes: a designed cover 10 attached to a ceiling wall in an inside of a vehicle compartment; and a light source unit 20 arranged in the rear of the designed cover. In this system, a light beam emitted from an emission port 25 of the light source unit illuminates the inside of the vehicle compartment through two irradiation holes 15 for spot illumination, which are provided in the designed cover. A light guide 50 is arranged between the emission port 25 of the light source unit and the two irradiation holes 15 of the designed cover. The light guide 50 is configured to divide the light beam emitted from the light source unit into two directions, and to guide the thus-divided light beams to the respective irradiation holes.

4 Claims, 21 Drawing Sheets

VEHICLE INTERIOR LIGHTING SYSTEM

BACKGROUND OF THE INVENTION

1. Field of the Invention

The present invention relates to a vehicle interior lighting system which is installed in the ceiling of a vehicle compartment.

2. Description of the Related Art

FIG. 1 shows a conventional example of the vehicle interior lighting system which is installed in the ceiling of the compartment (see Japanese Patent Application Laid-Open No. 2003-175765).

This vehicle interior lighting system 200 includes: a main illuminator 210 configured to illuminate a wide area in the compartment; two spot illuminators 220 each configured to illuminate a narrow area in the compartment; and a switch 230, which are provided to a designed cover 201 attached to the ceiling wall of a vehicle. The main illuminator 210 is provided with multiple LEDs 211 functioning as a light source and an outer lens 212. Each spot illuminator 220 is provided with an LED (not illustrated) and an outer lens 222.

In the conventional vehicle interior lighting system 200, each of the illuminators 210, 220 and 220 is equipped with at least one LED. This increases the number of parts, thus causing weight and cost increase. Furthermore, the two spot illuminators 220 tend to exhibit unevenness in color and illuminance even if two LEDs with the same color are used for the two spot illuminators 220, because the two LEDs vary from each other. This may cause difference in appearance among illuminated areas depending on which LED to be used.

SUMMARY OF THE INVENTION

The present invention has been made in view of these circumstances, and an object of the present invention is to provide a vehicle interior lighting system which makes it possible to reduce weight and cost, and to be easily assembled by reducing the number of light sources, as well as to reduce unevenness in color and illuminance by sharing a single light source among multiple illuminators.

To achieve the object, according to a first aspect of the present invention, there is provided a vehicle interior lighting system includes: a designed cover attached to a ceiling wall in the inside of a vehicle compartment; and a light source unit arranged in the rear of the designed cover. In this configuration, a light beam emitted from an emission port of the light source unit illuminates the inside of the compartment through multiple illuminators provided in the designed cover. Moreover, a light guide is arranged between the emission port of the light source unit and the multiple illuminators in the designed cover, the light guide being configured to divide the light beam emitted from the emission port of the light source unit into multiple light beams which travel in different directions, and thereby to guide the light beams thus divided to the respective multiple illuminators.

The first aspect of the present invention makes it possible to make the number of light source units smaller than the number of illuminators provided in the designed cover, since the light beam from the light source unit is divided into the multiple light beams and thereby the multiple light beams are guided to the multiple illuminators. This makes it possible to guide the light beam from the single light source unit to the two illuminators, for example. Consequently, the reduction in the number of light source units enables weight and cost reduction. Concurrently, the reduction in the number of wirings enables this system to be easily assembled. Furthermore, since the light from the common light source unit is guided to the multiple illuminators, unevenness in color and illuminance of the light beams can be reduced, which would otherwise lo occur due to variations among light source units themselves.

A second aspect of the present invention is the vehicle interior lighting system according to the first aspect thereof, in which: as the multiple illuminators, the designed cover is provided with multiple irradiation holes for spot illumination, through which small areas away from each other are respectively illuminated; the light source unit is arranged in a location away from the multiple irradiation holes by almost the same distance; the light guide includes a light incident surface, a light dividing unit, arms and light emitting surfaces. The light incident surface is configured so that the light beam emitted from the emission port of the light source unit is incident thereon. The light dividing unit is configured to divide the light beam incident on the light incident surface into the multiple light beams which travel in the different directions. The number of the different directions corresponds to the number of the irradiation holes. The arms are configured to guide the light beams divided by the light dividing unit to the irradiation holes, respectively. The light emitting surfaces are provided on the respective end portions of the arms so as to correspond to the irradiation holes, and thereby configured to emit the light beams having come to the light emitting surfaces through the arms to the irradiation holes, respectively.

The second aspect of the present invention makes it easy to perform control such that the amounts of light beams through the multiple illuminators can be equal to one another, since the light source unit is arranged in the location away from the multiple illuminators by almost the same distance.

A third aspect of the present invention is the vehicle interior lighting system according to the first or the second aspect thereof, in which: as the multiple illuminators, the designed cover is provided with multiple irradiation holes for spot illumination, through which small areas away from each other are respectively illuminated; the light source unit is arranged in a location opposed to one irradiation hole among the multiple irradiation holes; and the light guide includes a light incident surface, a light dividing unit, a first light emitting surface, arms, and second light emitting surfaces. The light incident surface is configured so that the light beam emitted from the emission port of the light source unit is incident thereon. The light dividing unit is configured to divide the light beam incident on the light incident surface into the multiple light beams which travel in the different directions. The number of the different directions corresponds to the number of the irradiation holes. The first light emitting surface is configured to emit one light beam toward the one irradiation hole located opposed to the light source unit. The one light beam is one of the light beams having been divided by the light dividing unit and thus traveling in one direction. The arms are configured to respectively guide the other light beams toward the other irradiation holes. The other light beams are the other of the light beams which have been divided by the light dividing unit and thus traveling in the other directions, respectively. The second light emitting surfaces are provided on the respective end portions of the arms so as to correspond to the other irradiation holes, and thereby configured to emit the light beams having come to the second light emitting surfaces through the arms toward the other irradiation holes, respectively.

The third aspect of the present invention makes it possible to guide the light from the single light source unit to the illuminators at desired positions, and to cause the light beams to illuminate the inside of the vehicle compartment through the illuminators, respectively, by setting appropriately the number, directions and lengths of the arms. That is because the light source unit is arranged in the location opposed to one of the multiple illuminators, and because the rest of illuminators receive the light beams through the arms of the light guide, respectively.

A fourth aspect of the present invention is the vehicle interior lighting system according to any one aspect among the first aspect to the third aspect thereof, in which: as the multiple of illuminators, the designed cover is provided with an irradiation hole for spot illumination, through which a small area is illuminated, and a surface-shaped illuminator (a flat-surface-shaped illuminator) configured to emit light in a shape of a plane; the light source unit is arranged in a location opposed to the irradiation hole for spot illumination; and the light guide includes a light incident surface, a light dividing unit, a first light emitting surface, an arm, and a second light emitting surface. The light incident surface is configured so that the light beam emitted from the emission port of the light source unit is incident thereon. The light dividing unit is configured to divide the light beam incident on the light incident surface into two light beams. The first light emitting surface is configured to emit one of the two light beams having divided by the light dividing unit toward the irradiation hole. The arm is configured to guide the other of the two light beams having divided by the light dividing unit toward the surface-shaped illuminator. The second light emitting surface is provided in the arm so as to correspond to the surface-shaped illuminator, and thereby configured to emit the light beam having come to the second light emitting surface toward the surface-shaped illuminator in the shape of a plane.

In a case where, for example, a designed unit formed of optical transparent resin is illuminated from its rear by surface light emission, the fourth aspect of the present invention needs no light source unit for the designed unit besides the light source unit for spot illumination, thus reducing the number of light source units, and thereby enabling size reduction. That is because the light beam from the light source unit is divided into a light beam for the spot illumination and a light beam for a surface-shaped illuminator (a light beam for the illumination by surface light emission).

A fifth aspect of the present invention is the vehicle interior lighting system including: a designed cover attached to a ceiling wall in an inside of a vehicle compartment; and a light source unit arranged in a rear of the designed cover. In this configuration, a light beam emitted from an emission port of the light source unit illuminates the inside of the vehicle compartment through a single illuminator provided in the designed cover; and a prism-shaped light guide is arranged between the emission port of the light source unit and the single illuminator in the designed cover. The light guide is configured to divide the light beam from the emission port of the light source unit into multiple light beams which travel in different directions, and thus to emit the light beams thus divided in the different directions through the single illuminator.

In a case where spot light beams illuminate different directions, the fifth aspect of the present invention makes it possible to reduce the number of light source units. That is because the provision of the prism-shaped light guide allows the light to illuminate the different directions through the single illuminator. Accordingly, the reduction in the number of light source units enables weight and cost reduction. Concurrently, the reduction of the number of wirings enables this system to be easily assembled, as well as enables size and space reduction. Moreover, since the light from the common light source unit is guided to the multiple illuminators, unevenness in color and illuminance of the light beams can be reduced, which would otherwise occur due to variations among light source units themselves.

A sixth aspect of the present invention is the vehicle interior lighting system according to any one aspect among the first aspect to the fifth aspect, in which: as a light source, an LED is provided in the light source unit; and a fluorescent agent for changing a hue of light from the LED is contained in the light guide.

The sixth aspect of the present invention enables cost reduction, since use of a fluorescent agent contained in the light guide enables the blue light from a low-cost blue LED, for example, to be changed into white light.

BRIEF DESCRIPTION OF THE
ACCOMPANYING DRAWINGS

The above and further objects and novel features of the present invention will more fully appear from the following detailed description when the same is read in conjunction with the accompanying drawings, in which:

FIG. 6A is a perspective view of the light source unit viewed from its rear, and FIG. 6B is a perspective view thereof viewed from its front;

FIG. 7A is a perspective view of the light guide viewed from its front, and FIG. 7B is a perspective view thereof viewed from its rear;

FIG. 13A is a perspective view of the light guide viewed from its front, and FIG. 13B is a perspective view thereof viewed from its rear;

DETAILED DESCRIPTION OF THE PREFERRED EMBODIMENTS

Descriptions will be provided hereinafter for embodiments of the present invention by referring to drawings.
<First Embodiment>

Referring now to FIGS. 2 to 10, a first embodiment according to the present invention will be explained hereinbelow.

Figure 1:
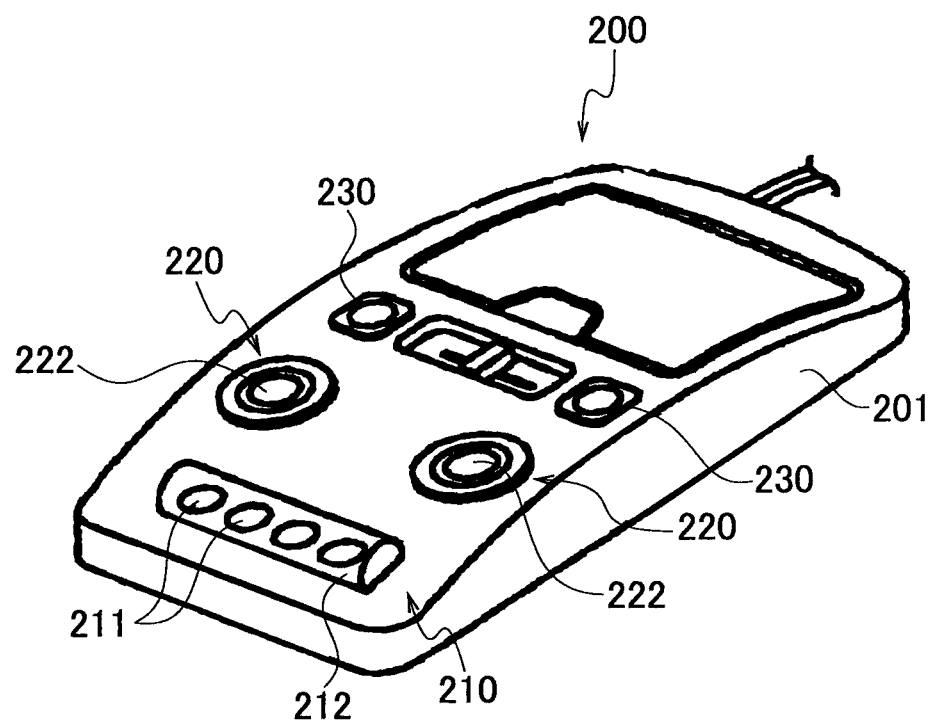
FIG. 1 is a perspective view of an appearance of a conventional vehicle interior lighting system.
Figure 2:
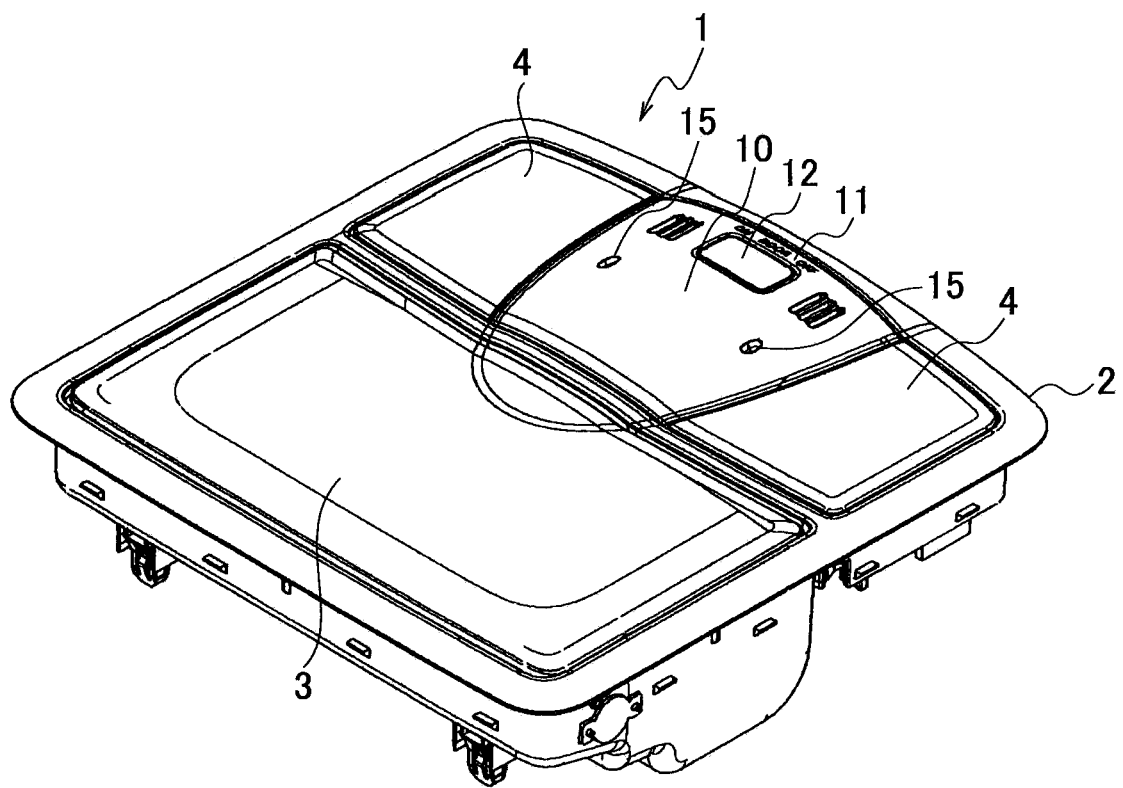
FIG. 2 is a perspective view of an appearance of a vehicle interior lighting system according to a first embodiment of the present invention, which is viewed from its front.
Figure 3:
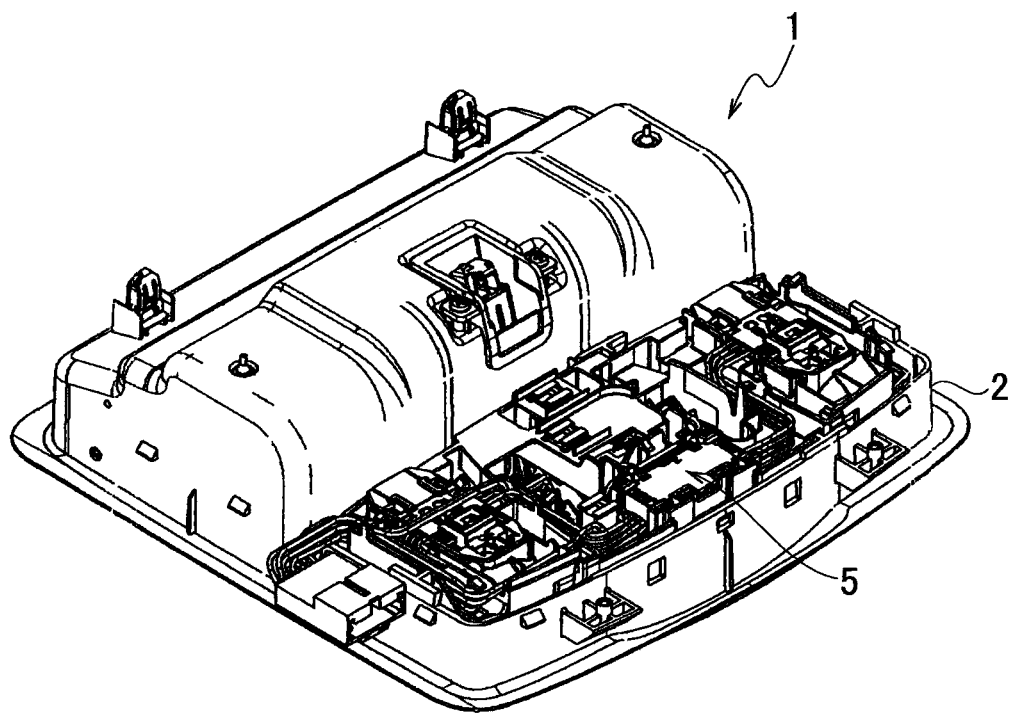
FIG. 3 is a perspective view of the appearance shown in FIG. 2, which is viewed from its rear.

As shown in FIGS. 2 and 3, a vehicle interior lighting system 1 includes: a housing 2 located in the rear of this system; a functional unit 5 located in the rear thereof; a cover 3 for a sunglass holder; a lens cover 4 for a main illuminator; and a designed cover 10 for spot illuminators. The housing 2 and the functional unit 5 are embedded in a ceiling in the inside of a vehicle compartment. The cover 3, the lens cover 4 and the designed cover 10 are coverings located in the front of this system.

Figure 4:
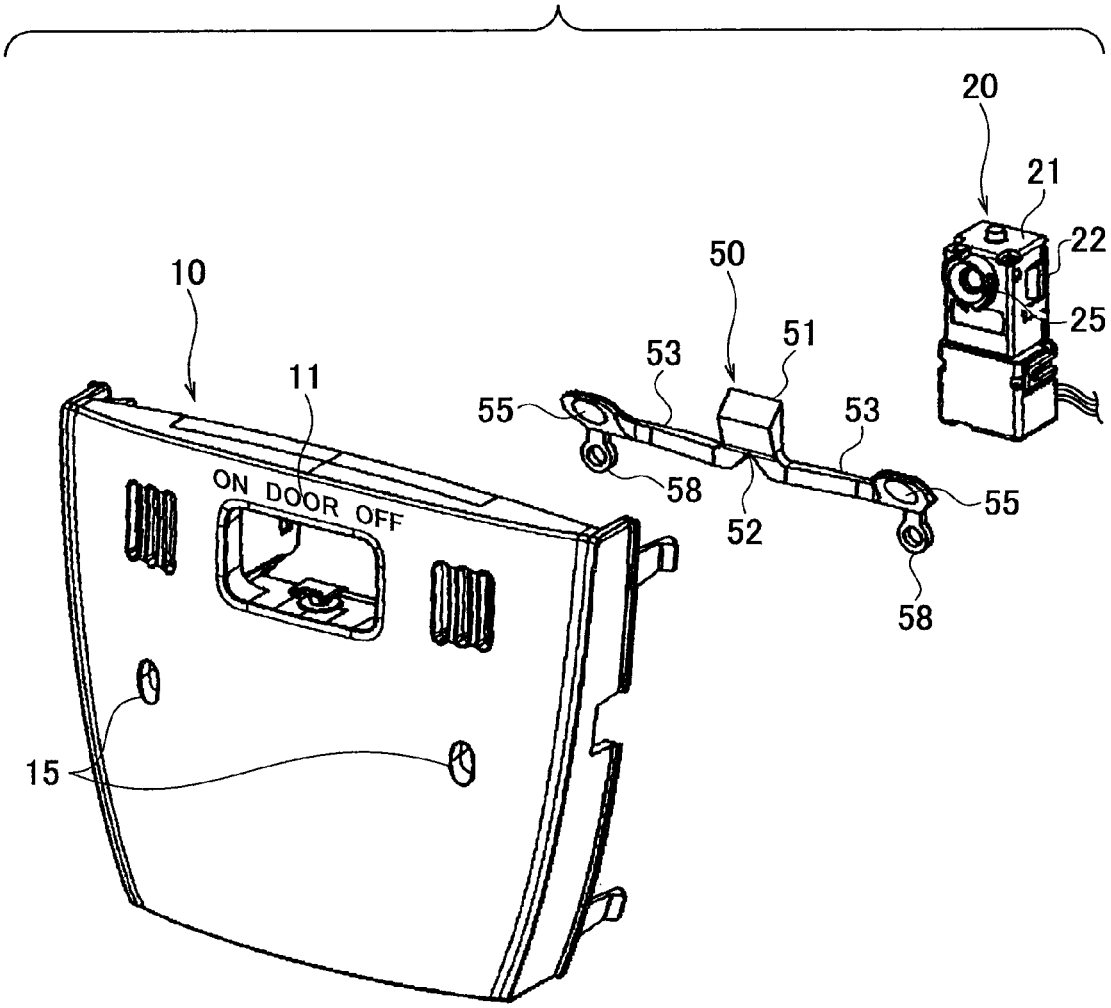
FIG. 4 is an exploded perspective view of the system shown in FIG. 2 viewed from its front, showing a relationship among a designed cover for spot illuminators, a light guide and a light source unit equipped in the rear of the designed cover.
Figure 5:
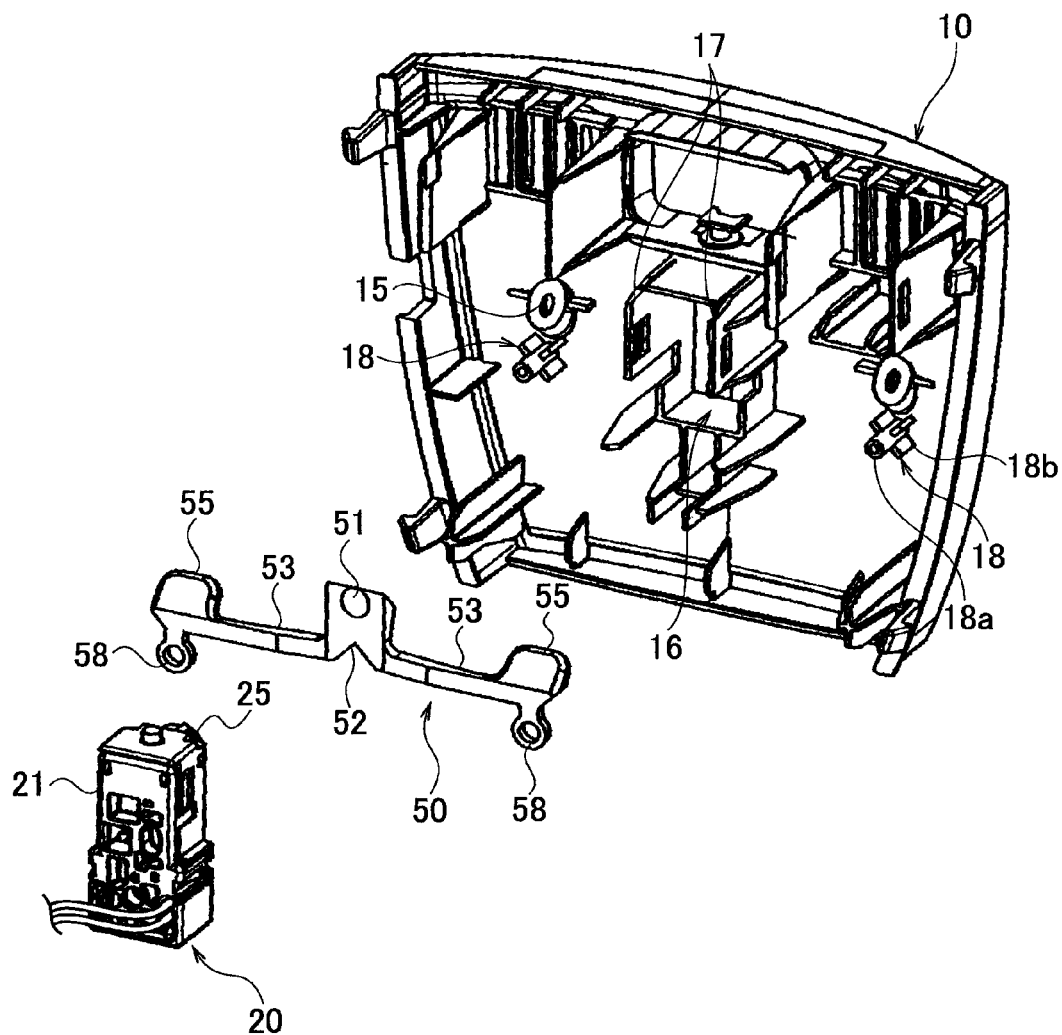
FIG. 5 is a perspective view of the system shown in FIG. 2 viewed from its rear.

The designed cover 10 for the spot illuminators is capable of being attached to and detached from the housing 2. As shown in FIGS. 4 and 5, a light guide 50 and a light source unit 20 are fitted to the rear of the designed cover 10.

Two spot irradiation holes (illuminators) 15 for a map lamp and a switch 12 are provided in a center portion of the designed cover 10. The spot irradiation holes (hereinafter simply referred to as "irradiation holes") are located away from each other, and penetrate the center portion of the designed cover 10. A designed unit 11 for the switch 12 is provided in a vicinity of the switch 12. The irradiation holes 15 are transparent holes for spot illumination, through which to illuminate small areas away from each other, respectively. In the designed unit 11, a character part with optical transparency is configured to shine when the designed unit 11 is illuminated from its rear (from the inside of the designed cover 10).

Figure 6A:
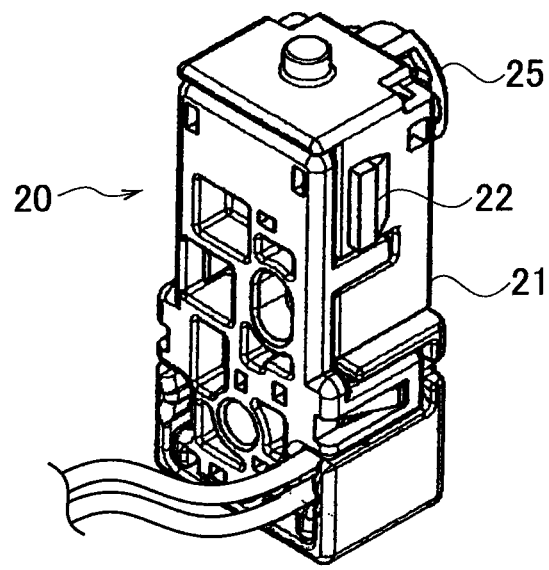
FIGS. 6A and 6B are configuration diagrams showing the light source unit.
Figure 6B:
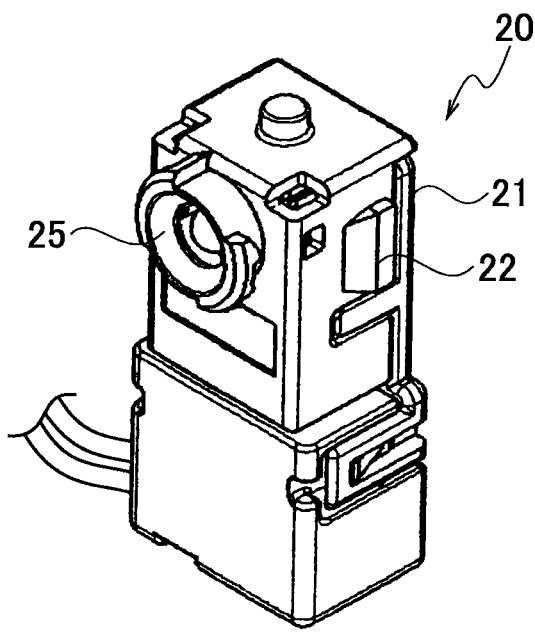

As shown in FIGS. 6A and 6B, the light source unit 20 includes an LED (not illustrated) in the inside of a light-shielding case 21 as a light source. With one-touch operation, the light source unit 20 is configured to be fixed to a predetermined location by causing engaged parts (for example, claws) 22 provided on the sides of the case 21 to be engaged with engaging parts (for example, engagement holes) 17 of a light source unit attaching unit 16 provided in the rear of the designed cover 10. The light source unit 20 includes, in its front, an emission port 25 through which a light beam from the LED goes out to the outside. In this embodiment, the light source unit attaching unit 16 is arranged in a location which is away from the irradiation holes 15 by almost the same distance, i.e., in the middle between the two irradiation holes 15.

The light guide 50 is provided between the emission port 25 of the light source unit 20 and the two irradiation holes 15 of the designed cover 10, and is configured to divide a light emitted from the emission port 25 into two directions, and thus to guide the resultant two light beams to the corresponding irradiation holes 15. The light guide 15 is made of transparent resin such as acryl or polycarbonate.

Figure 7A:
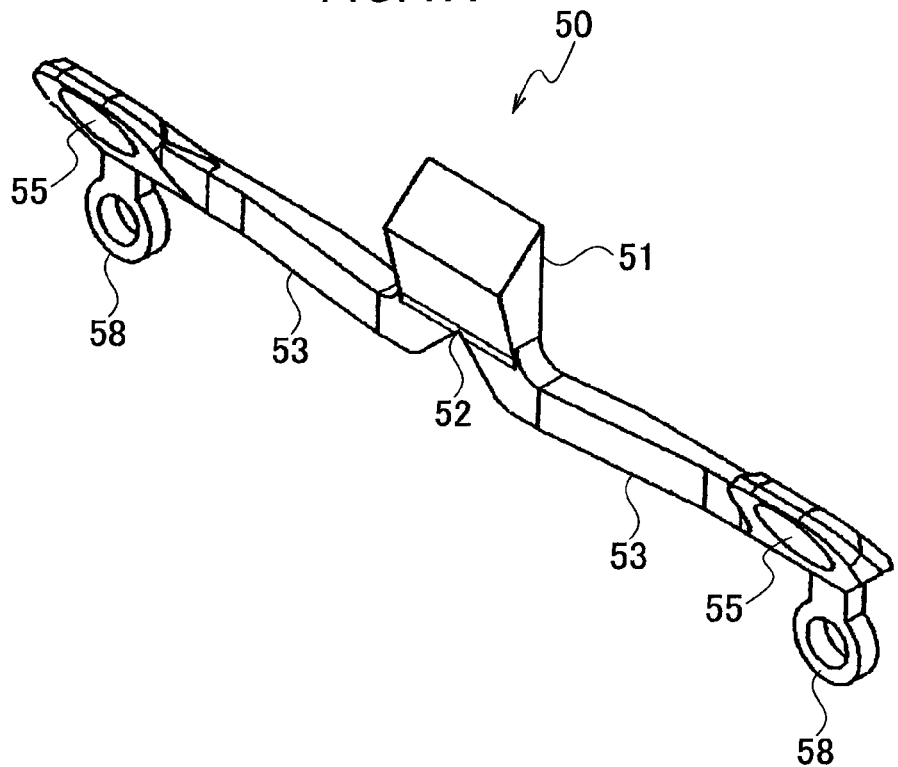
FIGS. 7A and 7B are configuration diagrams showing the light guide.
Figure 7B:
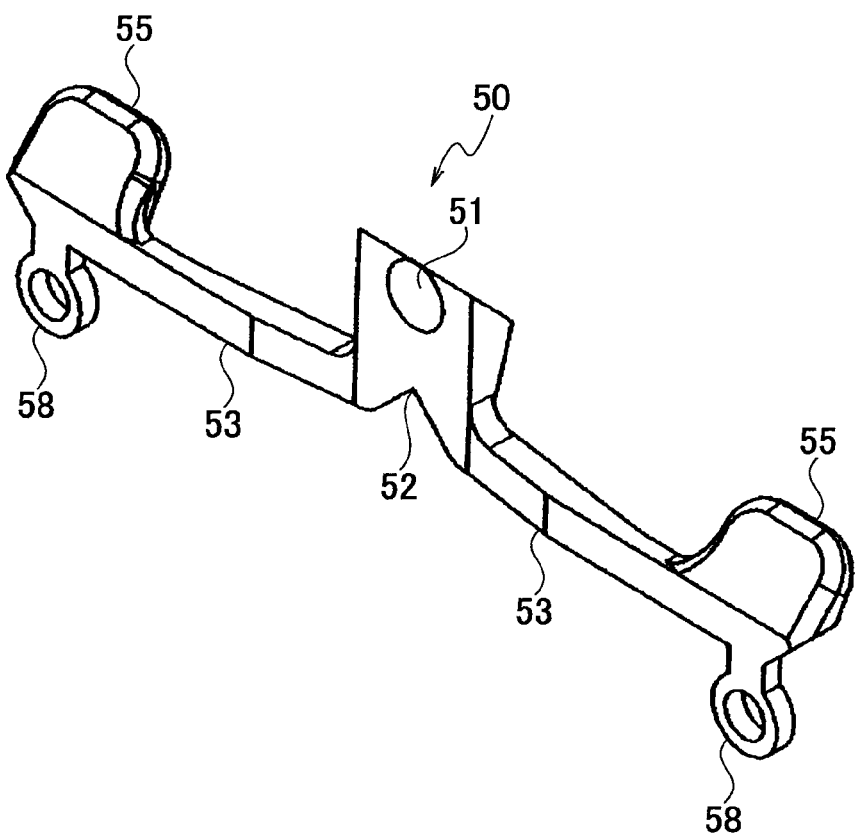

As shown in FIGS. 7A and 7B, the light guide 50 is provided with a light incident surface 51, a light dividing unit 52, left and right arms 53, light emitting surfaces 55, and holed brackets 58. The light incident surface 51 is configured to receive the incident light emitted from the emission port 25 of the light source unit 20. The light dividing unit 52 is configured to divide the light incident on the light incident surface 51 into multiple directions (two directions in this case) whose number corresponds to the number of irradiation holes 15. The left and right arms 53 are configured to guide the resultant multiple light beams divided by the light dividing unit 52 to the respective irradiation holes 15. The light emitting surfaces 55 are provided on the respective end portions of the arms 53 so as to correspond to the irradiation holes 15, whereby the light beams having traveled through the arms 53 are caused to go out toward the irradiation holes 15 from the light emitting surfaces 55, respectively. The brackets 58 are configured to attach the light guide 50 to the designed cover 10.

Figure 9A:
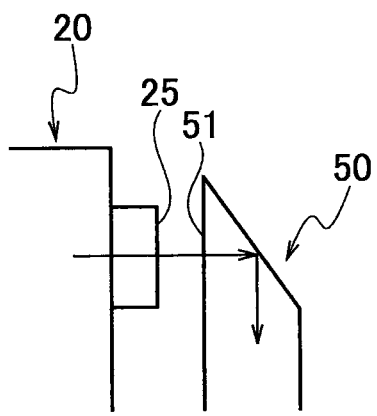
FIG. 9A is a side view showing a relationship between a light incident surface of the light guide and an emission port of the light source unit.
Figure 9B:
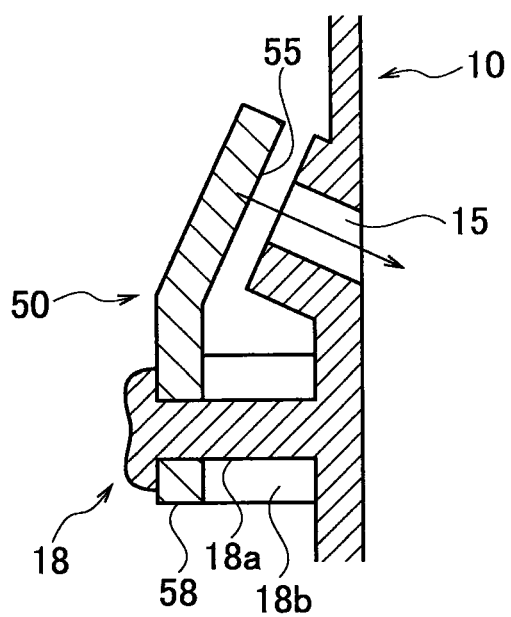
FIG. 9B is a side cross-sectional view showing a relationship between a light emitting surface of the light guide and an irradiation hole of the designed cover when the light guide is attached to the designed cover.
Figure 10:
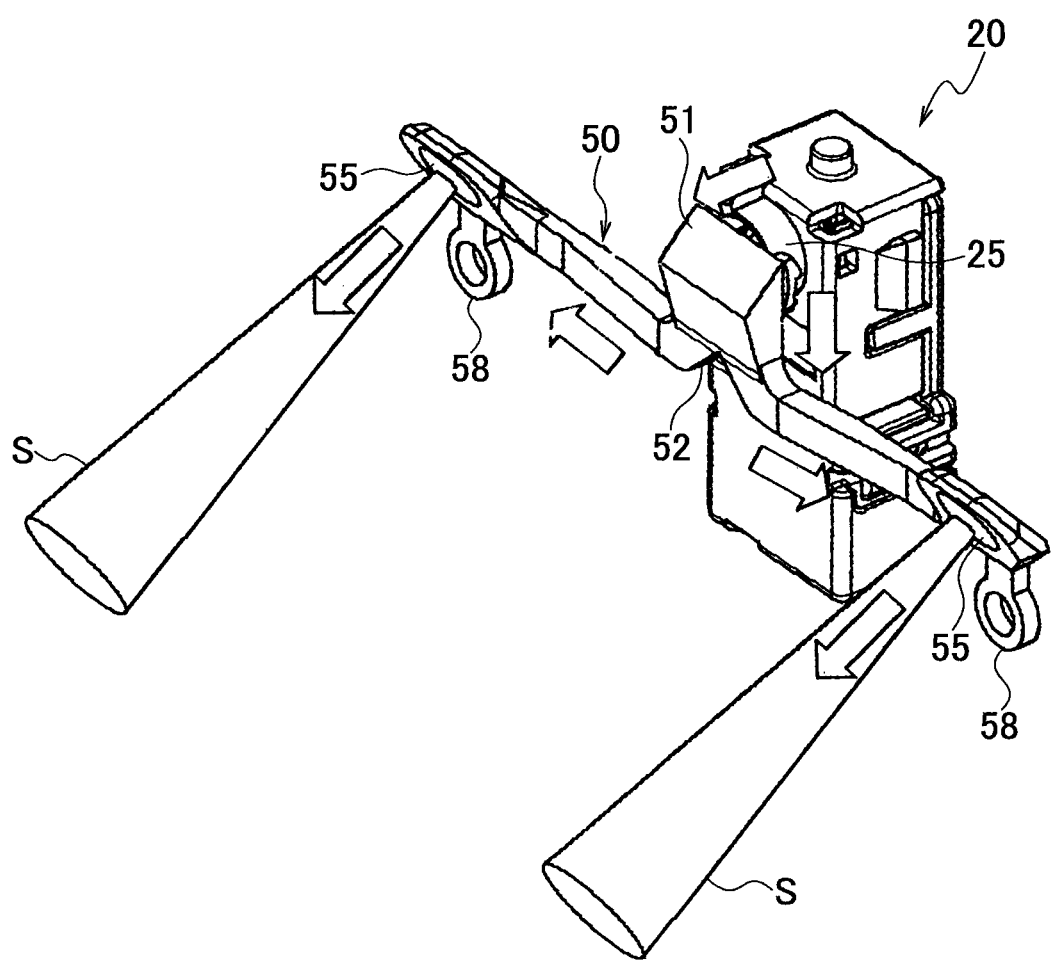
FIG. 10 is a perspective view schematically showing paths of light beams to be emitted by a combination of the light source unit and the light guide.

As attaching units 18 to attach the light guide 50 to the designed cover 10, bosses 18a with ribs 18b are provided to the designed cover 10. As shown in FIG. 9B, the light guide 50 is fixed to the designed cover 10 through the following process. First, the bosses 18a are fitted into the holes of the brackets 58, respectively. Then, the brackets 58 are caused to abut on the abutment surfaces of the ribs 18b, respectively. Subsequently, the end portions of the bosses 18a are melted, whereby the brackets 58 are welded to the respective attaching units 18. The light guide 50 may be fixed to the designed cover 10 with screws instead of by welding.

Figure 8:
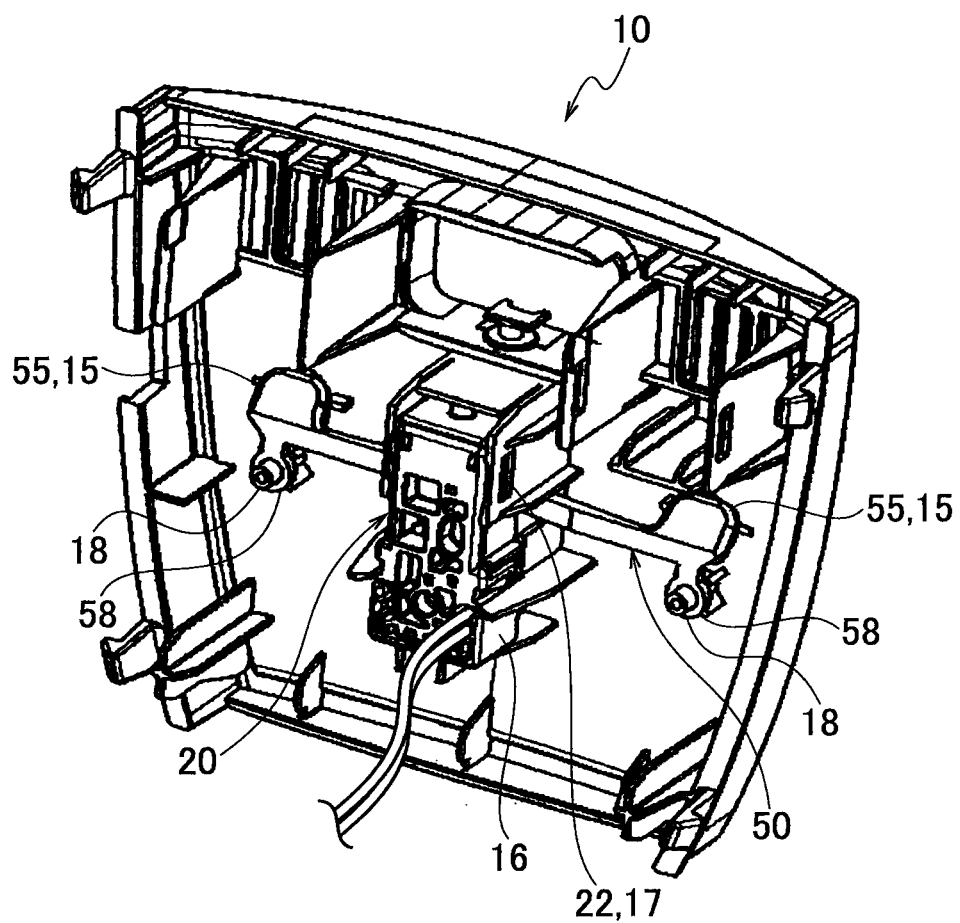
FIG. 8 is a perspective view of the designed cover viewed from its rear, showing how the light source unit and the light guide are fitted to the rear of the designed cover.

Furthermore, as shown in FIG. 8, the light source unit 20 is attached and fixed to the light source unit attaching unit 16 of the designed cover 10 by putting the light source unit 20 over the light guide 50 thus fixed. Thereby, as shown in FIG. 9A, the emission port 25 of the light source unit 20 and the light incident surface 51 of the light guide 50 are positioned to each other in a non-contact manner with an appropriate space in between. Simultaneously, as shown in FIG. 9B, the light emitting surfaces 55 of the light guide 50 and the irradiation holes 15 of the designed cover 10 are positioned to each other in a non-contact manner with an appropriate space in between.

Note that, in consideration of the dimensional tolerance and the like, the light incident surface 51 of the light guide 50 is larger than the emission port 25 of the light source unit 20, and each light emitting surface 55 of the light guide 50 is larger than each irradiation hole 15.

With the configuration described above, as shown by hollow arrows in FIG. 10, the light beam from the light source unit 20 is divided into the two directions by the light dividing unit 52 of the light guide 50. Then, the resultant two light beams are guided to the two irradiation holes 15 through the left and right arms 53, respectively. Thereby, two spotlight beams S can illuminate predetermined areas in the inside of the compartment from the irradiation holes 15, respectively.

In this case, light is supplied to the two irradiation holes 15 in the designed cover 10 from the single light source unit 20. Thereby, the number of light source units 20 can be reduced, thus resulting in weight and cost reduction. Additionally, since the number of wirings is reduced, this system can be assembled more easily. Furthermore, since the light beam from the common light source unit 20 is guided to the two irradiation holes 15 so as to illuminate the irradiation holes serving as the spotlight beams, it is possible to reduce unevenness in color and illuminance of the illuminated light beams, which would otherwise occur due to product variations of LEDs themselves serving as light sources. Moreover, in the case of the vehicle interior lighting system according to this embodiment, the light source unit 20 is arranged in the location which is away from the two irradiation holes 15 by almost the same distance. This makes it easy to perform control such that the amounts of light beams emitted through the two irradiation holes 15 can be equal to each other.

<Second Embodiment>

Descriptions will be provided hereinbelow for a second embodiment by referring to FIGS. 11 to 15.

Figure 11:
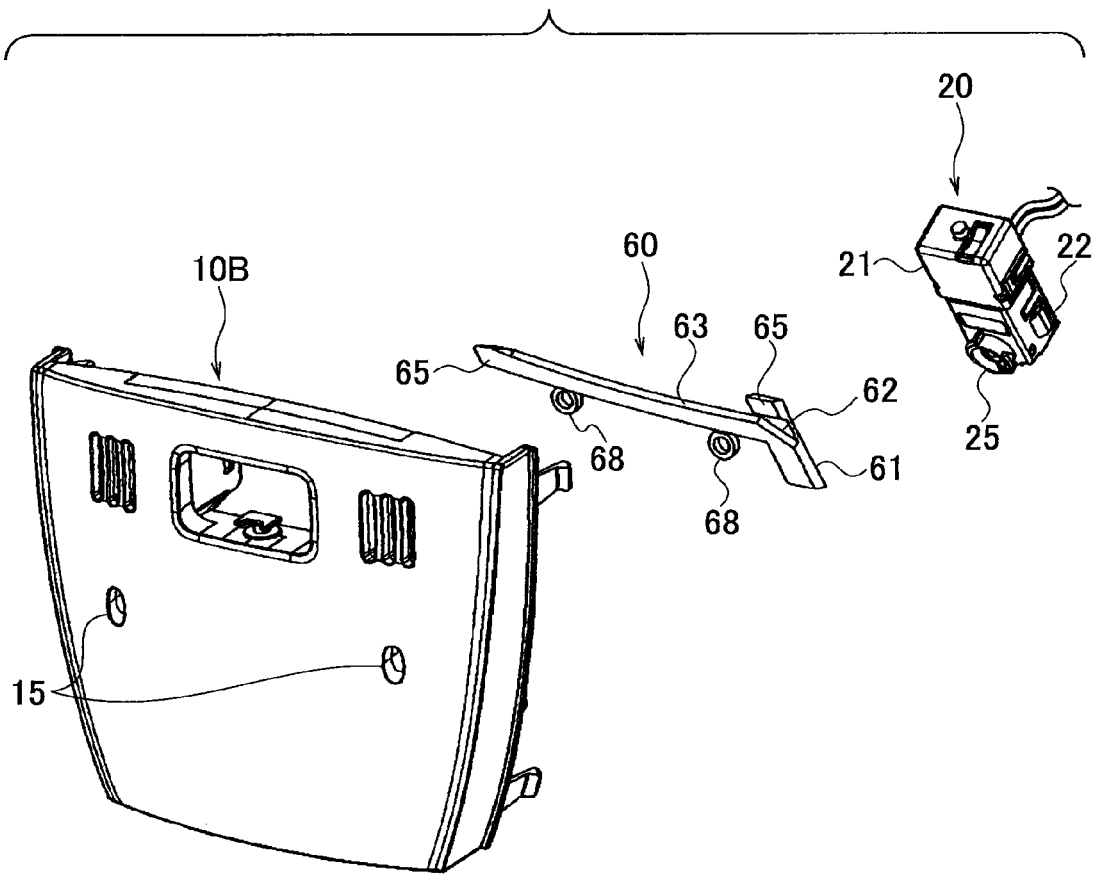
FIG. 11 is an exploded perspective view of a vehicle interior lighting system according to a second embodiment of the present invention viewed from its front, showing a relationship among a designed cover for spot illuminators, a light guide and a light source unit equipped in the rear of the designed cover.
Figure 12:
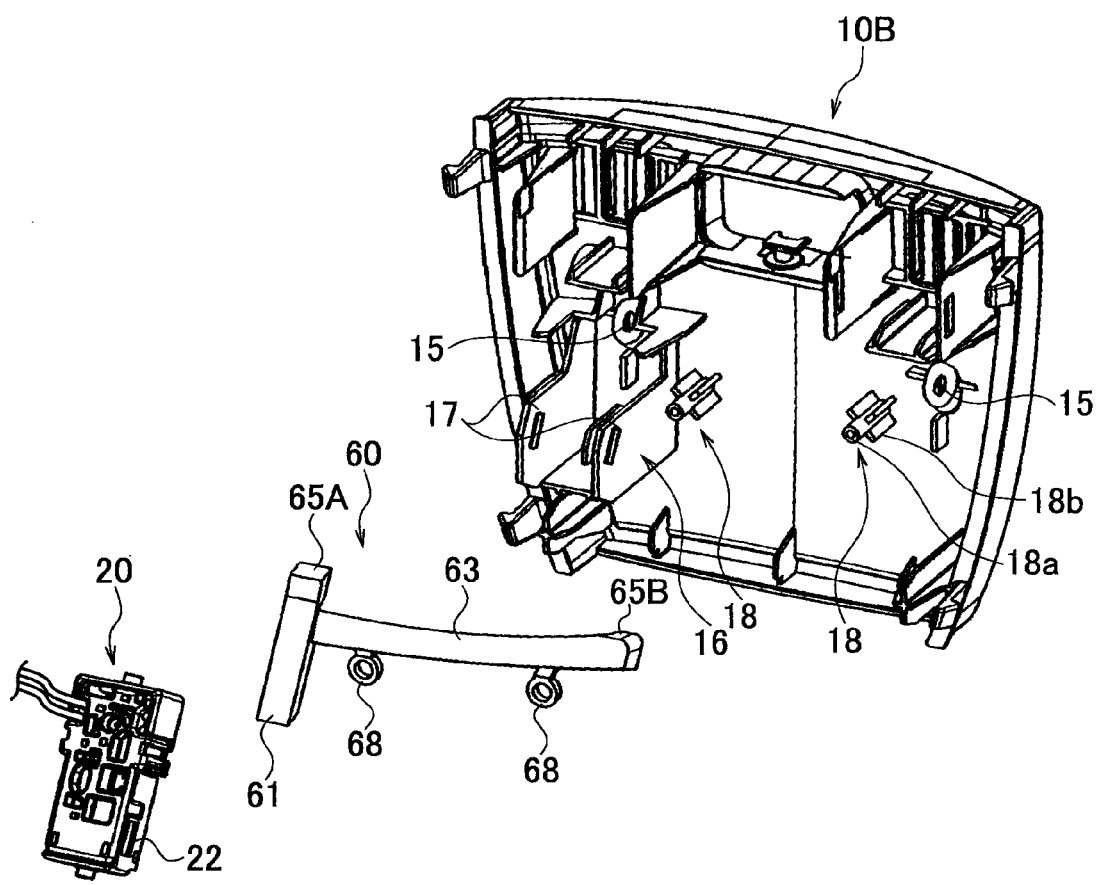
FIG. 12 is a perspective view of the system shown in FIG. 11 viewed from its rear.

As shown in FIGS. 11 and 12, a light guide 60 and a light source unit 20 are attached to the rear of a designed cover 10B for spot illuminators. Two spot irradiation holes (illuminators, hereinafter "irradiation holes") 15 for a map lamp are provided to the designed cover 10B. The two irradiation holes 15 are located away from each other, and penetrate the designed cover 10B. A light source unit attaching unit 16 is provided to one side of the rear of the designed cover 10B so that the light source unit 20 can be attached so as to face one of the two irradiation holes 15. The configuration of the light source unit 20 and attaching means thereof are the same as those of the first embodiment. Thus, the same components lo will be denoted by the same reference numerals, and descriptions thereof will be omitted.

Figure 13A:
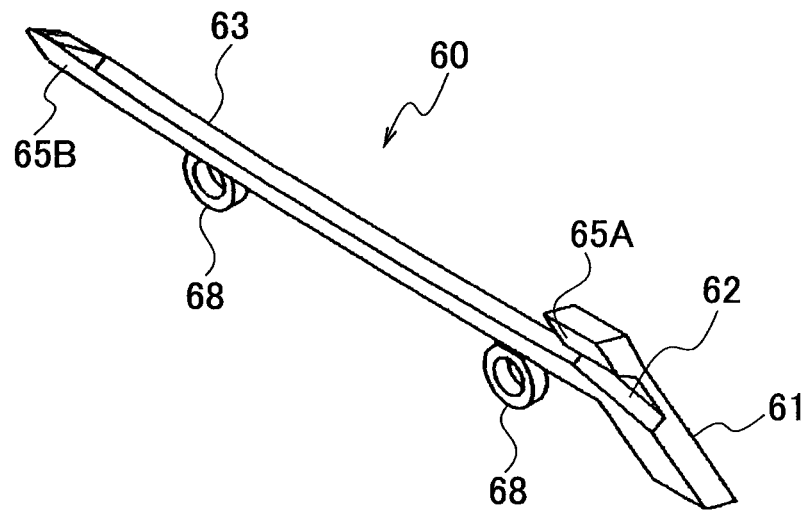
FIGS. 13A and 13B are configuration diagrams showing the light guide.
Figure 13B:
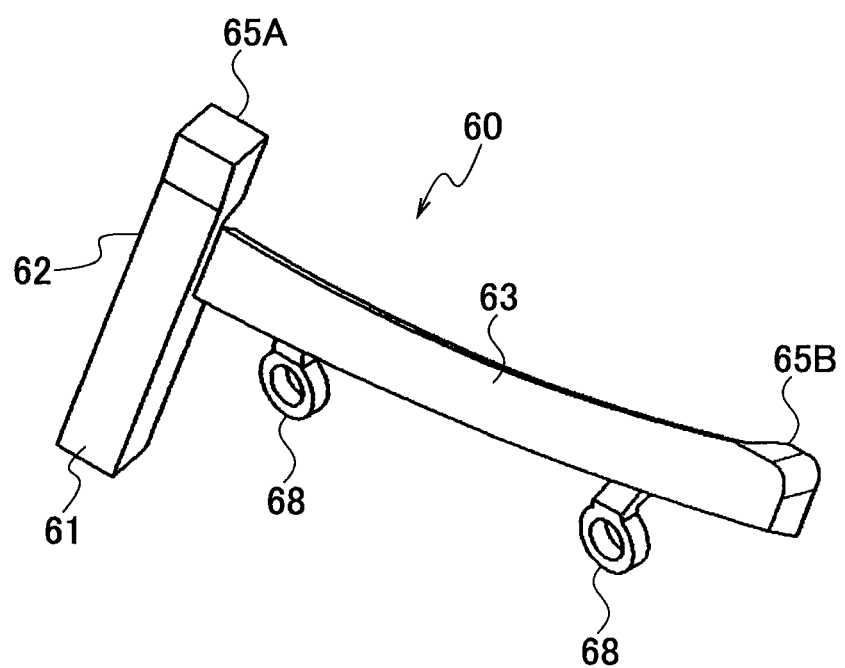

The light guide 60 is configured to divide a light beam emitted from an emission port 25 of the light source unit 20 into two directions, and thus to guide the resultant two light beams to the respective irradiation holes 15. The light guide 60 is made of transparent resin such as acryl or polycarbonate. As shown in FIGS. 13A and 13B, the light guide 60 is provided with a light incident surface 61, a light dividing unit 62, a first light emitting surface 65A, an arm 63, a second light emitting surface 65B, and holed brackets 68. The light incident surface 61 is configured to receive the incident light emitted from the emission port 25 of the light source unit 20. The light dividing unit 62 is configured to divide the light beam incident on the light incident surface 61 into two directions. The first light emitting surface 65A is configured to emit one light beam toward a first irradiation hole 15 located opposed to the light source unit 20. This light beam is one of the light beams having divided by the light dividing unit 62 and thus travels in a first direction. The arm 63 is configured to guide the other light beam to a second irradiation hole 15 located away from the first irradiation hole 15. This light beam is the other of the light beams having divided by the light dividing unit 62 and thus travels in the other direction. The second light emitting surface 65B is provided on the end portion of the arm 63 so as to correspond to the second irradiation hole 15. Thereby, the light beam having traveled through the arm 63 is caused to go out toward the second irradiation hole 15 from the second light emitting surface 65B. The brackets 68 are configured to attach the light guide 60 to the designed cover 10B.

Figure 14:
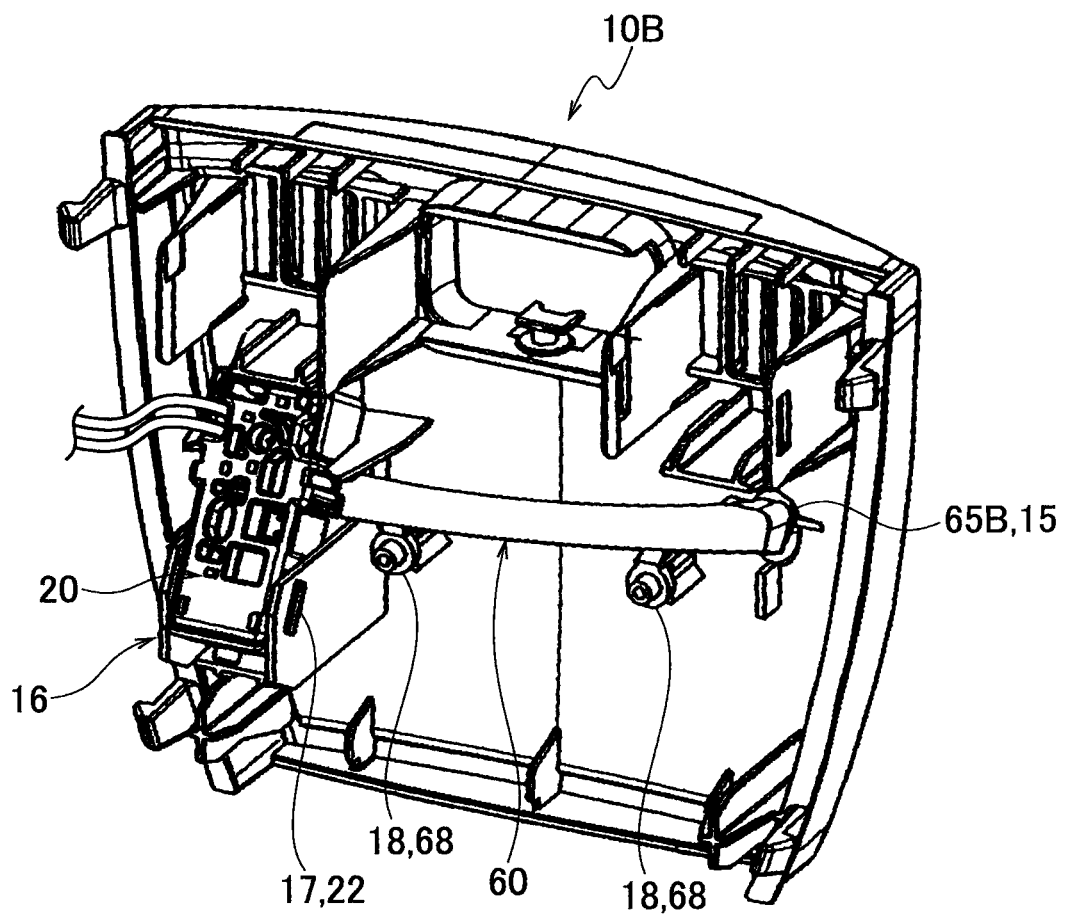
FIG. 14 is a perspective view of the designed cover viewed from its rear, showing how the light source unit and the light guide are fitted to the rear of the designed cover.
Figure 15:
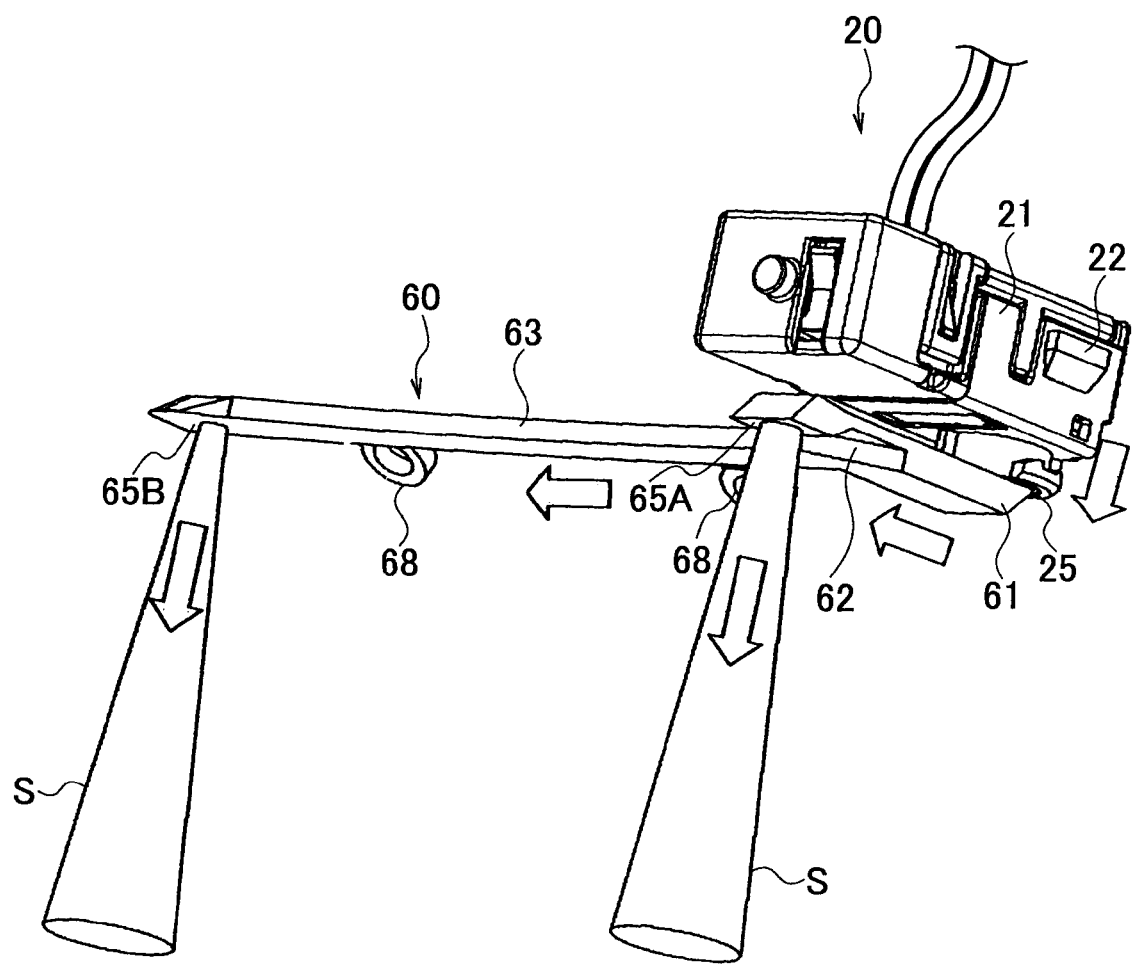
FIG. 15 is a perspective view schematically showing paths of light beams to be emitted by a combination of the light source unit and the light guide.

As attaching units 18 to attach the light guide 60 to the designed cover 10B, bosses 18a with ribs 18b are provided to the designed cover 10B, similar to the first embodiment. Thus, the light guide 60 is fixed to the designed cover 10B through the following process. First, the bosses 18a are fitted into the holes of the brackets 68, respectively. Then, the brackets 68 are caused to abut on the abutment surfaces of the ribs 18b, respectively. Subsequently, the end portions of the bosses 18a are melted. Thereby, the brackets 68 are welded to the respective attaching units 18. Thereafter, as shown in FIG. 14, the light source unit 20 is attached and fixed to a light source unit attaching unit 16 of the designed cover 10B by putting the light source unit 20 over the light guide 60. Thereby, an emission port 25 of the light source unit 20 and the light incident surface 61 of the light guide 60 are positioned to each other in a non-contact manner. Simultaneously, light emitting surfaces 65A and 65B of the light guide 60 and the irradiation holes 15 of the designed cover 10B are positioned to each other in a non-contact manner. In this case, the light guide 60 may be attached to the designed cover 10B with screws as well.

According to this embodiment, the light source unit 20 is arranged in the location opposed to one of the two irradiation holes 15, and one light beam is guided to the other irradiation hole 15 through the arm 63 of the light guide 60. Thus, a light beam from the single light source unit 20 can be guided to the irradiation holes 15 located in desired positions by setting the direction and length of the arm 63 appropriately. Accordingly, as shown by the two hollow arrows in FIG. 15, the two spotlight beams S from the respective irradiation holes 15 in the designed cover 10B can illuminate predetermined areas in the inside of the compartment. Thereby, the number of light source units 20 can be reduced, thus resulting in weight and cost reduction. Additionally, the reduction in the number of wirings makes it easier for this system to be assembled. Moreover, since one light beam from the common light source unit 20 is guided to the multiple irradiation holes 15 so as to illuminate the irradiation holes serving as the spotlight beams, it is possible to reduce unevenness in color and illuminance of the illuminated light beams, which would otherwise occur due to product variations of LEDs themselves as light sources.

<Third Embodiment>

Figure 16:
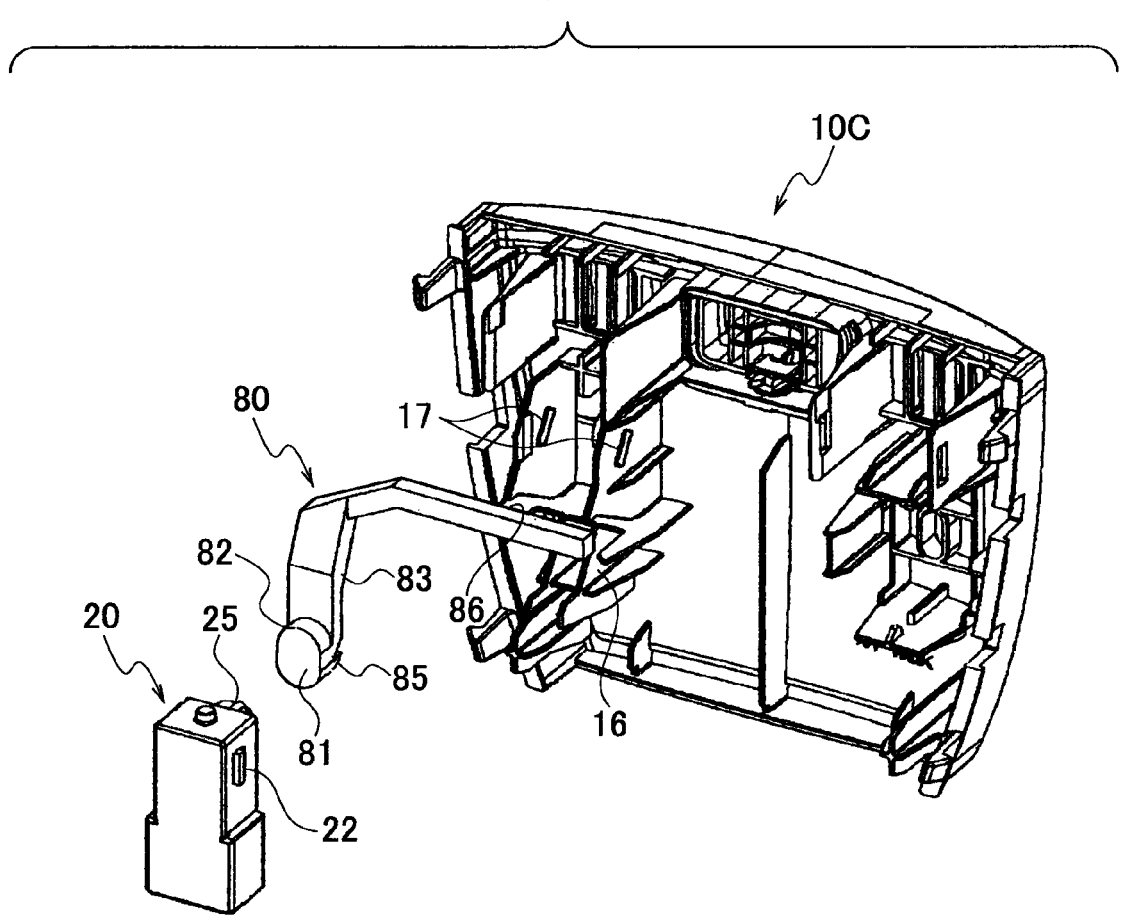
FIG. 16 is an exploded perspective view of a vehicle interior lighting system according to a third embodiment of the present invention viewed from its rear, showing a relationship among a designed cover for spot illuminators, a light guide and a light source unit equipped in the rear of the designed cover.
Figure 17:
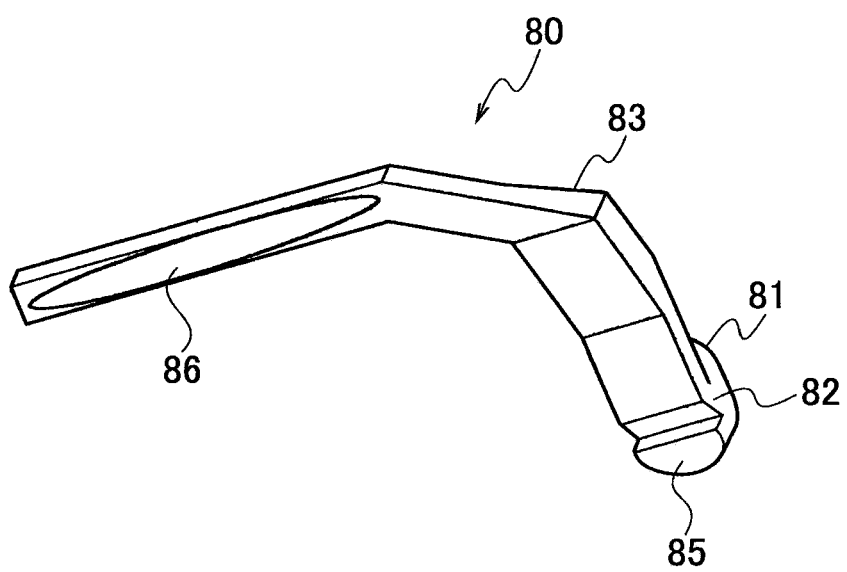
FIG. 17 is a perspective view of the light guide.
Figure 18:
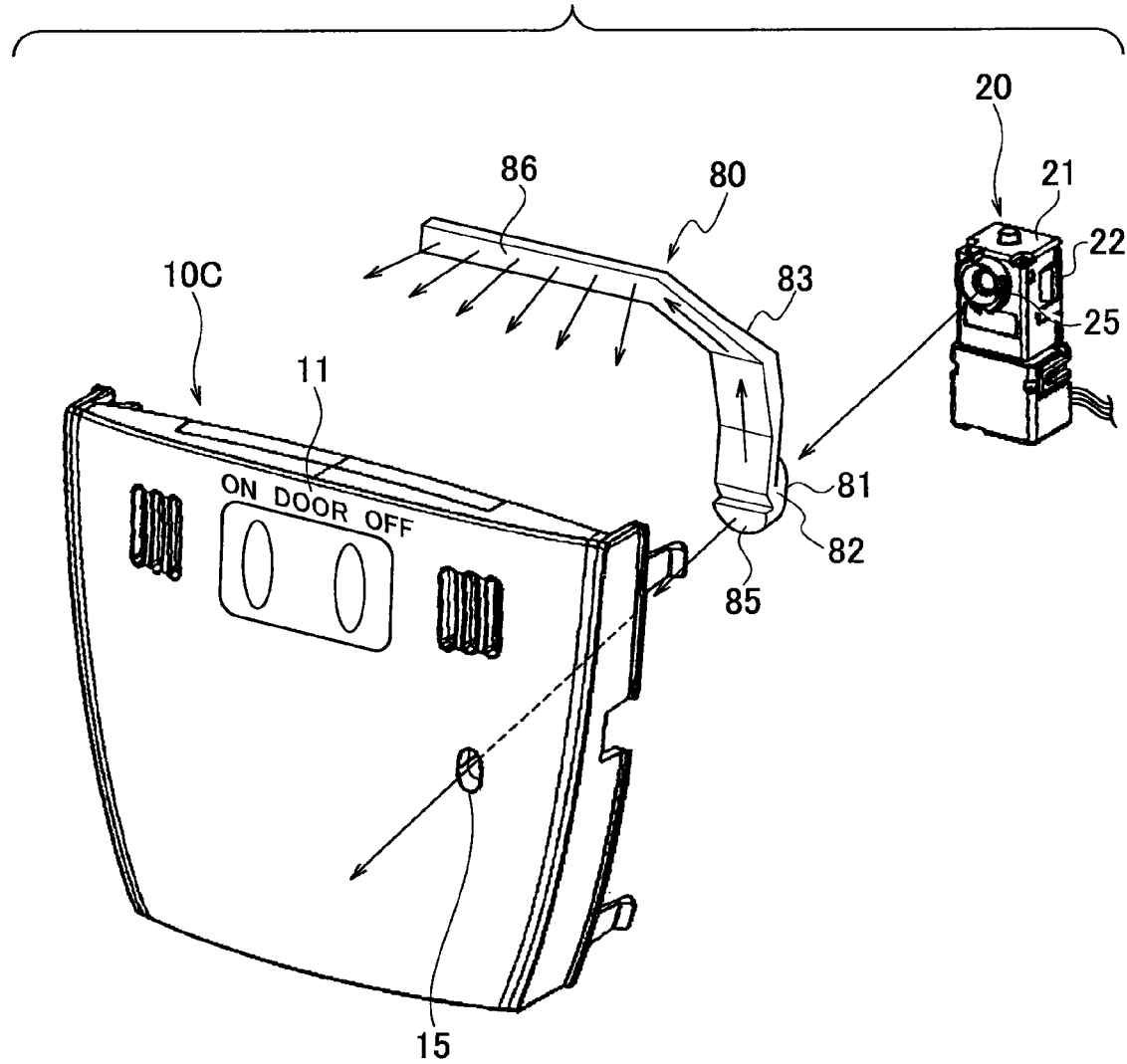
FIG. 18 is an exploded perspective view of the system viewed from its front, showing a relationship between the designed cover, the light guide and the light source unit.

Descriptions will be provided hereinbelow for a third embodiment by referring to FIGS. 16 to 18.

As multiple illuminators, a designed cover 10C includes: an irradiation hole 15 for spot illumination, through which a small area is illuminated; and a designed unit 11 which functions as a surface-shaped illuminator (a flat-surface-shaped illuminator), and is configured to emit light in the shape of a plane (of two dimensions). In the designed unit 11, a character part with optical transparency is configured to shine when the designed unit 11 is illuminated from its rear (from the inside of the designed cover 10C).

A light source unit 20 is arranged in a location opposed to the irradiation hole 15 for spot illumination. A light guide 80 is provided with a light incident surface 81, a light dividing unit 82, a first light emitting surface 85, an arm 83 and a second light emitting surface 86. The light incident surface 81 is configured to receive a light beam emitted from an emission port 25 of the light source unit 20. The light dividing unit 82 is configured to divide the light beam incident on the light incident surface 81 lo into two light beams. The first light emitting surface 85 is configured to emit one of the two light beams having divided by the light dividing unit 82 toward the irradiation hole 15. The arm 83 is configured to guide the other light beam to the designed unit 11 which is the surface-shaped illuminator. The second light emitting surface 86 is provided to the arm 83 so as to correspond to the designed unit 11, and thus is configured to emit the light beam having traveled through the arm 83 to the designed unit 11 in the shape of a plane.

The designed cover 10C is provided with an attaching unit (not illustrated) for attaching the light guide 80. When the light guide 80 is attached to the attaching unit, the first light emitting surface 85 of the light guide 80 is positioned to a location corresponding to the irradiation hole 15 of the designed cover 10C, and the second light emitting surface 86 is positioned to a location corresponding to the designed unit 11 of the designed cover 10C. Thereafter, when the light source unit 20 is attached and fixed to a light source unit attaching unit 16 of the designed cover 10C, the emission port 25 of the light source unit 20 and the light incident surface 81 of the light guide 80 are positioned to each other. The rest of the configuration is the same as that of each of the first and second embodiments. Thus, the same components are denoted by the same reference numerals, and descriptions thereof will be omitted.

According to this embodiment, one light beam from the single light source unit 20 is supplied to the irradiation hole 15 for spot illumination and the luminescent designed unit 11. This makes it unnecessary to prepare another light source unit for the designed unit 11 in addition to that for the spot illumination. This makes it possible to reduce the number of light source units 20, and thereby to reduce the weight and costs. Additionally, the reduction in the number of wirings makes it easier for this system to be assembled. Moreover, since one light beam from the common light source unit 20 is guided to the two illuminators (the irradiation hole 15 and the designed unit 11) so as to illuminate the two illuminators, it is possible to reduce unevenness in color and illuminance of the illuminated light beams, which would otherwise occur due to product variations of LEDs themselves as light sources. Particularly, this embodiment enables the predetermined design of the designed cover 10C to be caused to emit light. Thus, the designed unit 11 can be illuminated at night without adding a light source for the designed illumination, even in the designed unit 11 which is desired to be always lit but is difficult to be provided with a light source.

<Fourth Embodiment>

Figure 19:
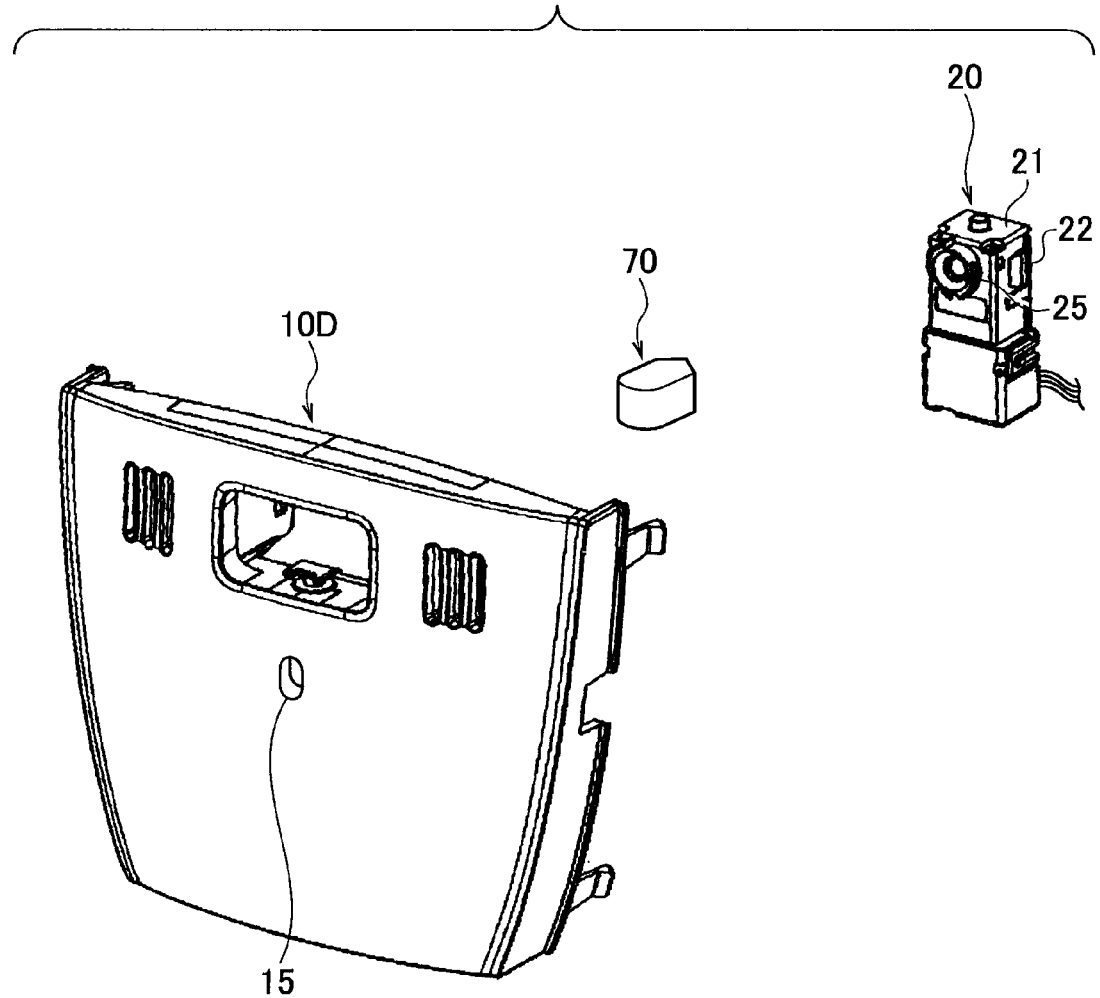
FIG. 19 is an exploded perspective view of a vehicle interior lighting system according to a fourth embodiment of the present invention viewed from its front, showing a relationship among a designed cover for spot illuminators, a light guide and a light source unit equipped in the rear of the designed cover.
Figure 20:
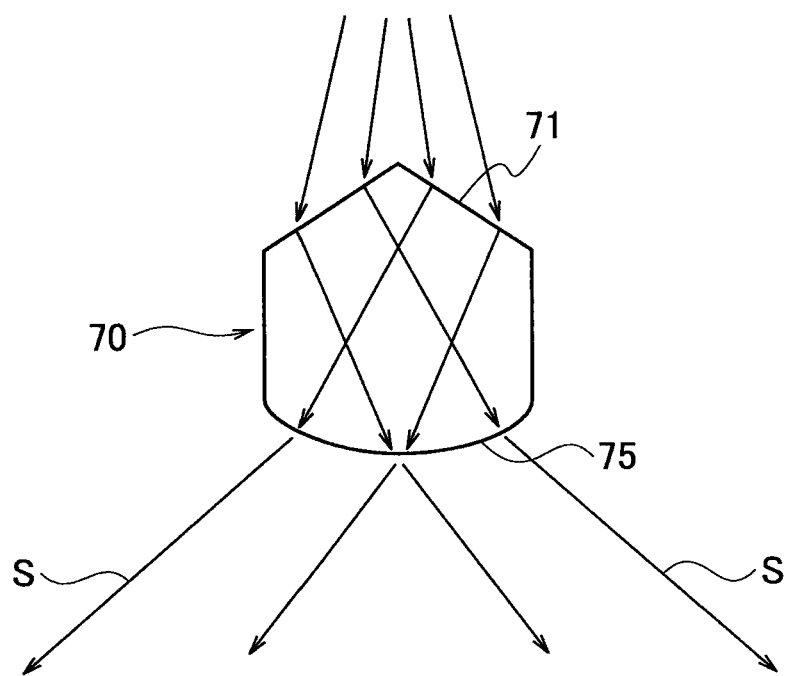
FIG. 20 is a plan view showing paths of light beams, into which the light guide divides a light beam.
Figure 21:
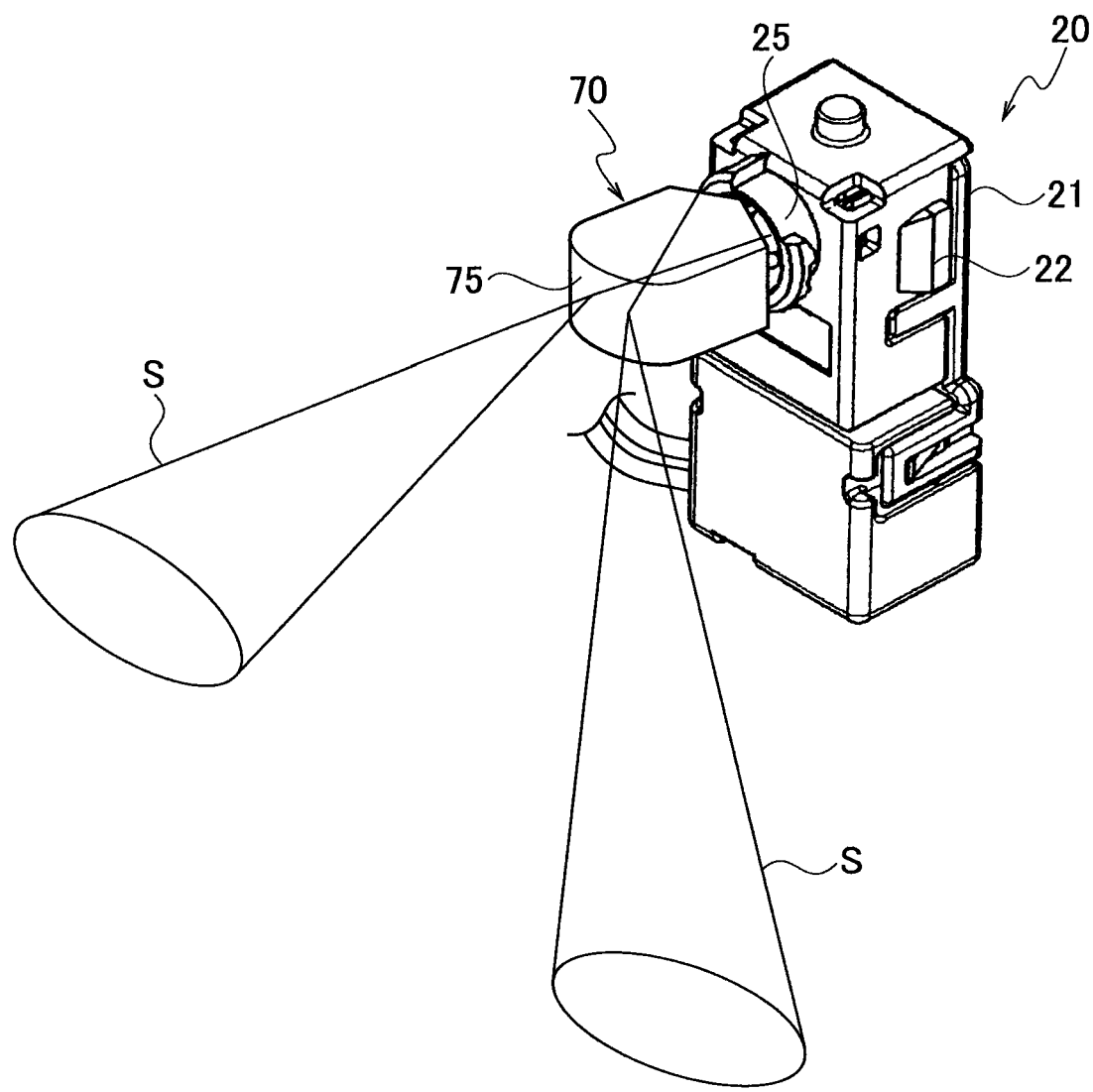
FIG. 21 is a perspective view schematically showing paths of light beams to be emitted by a combination of the light source unit and the light guide.

Descriptions will be provided hereinbelow for a fourth embodiment by referring to FIGS. 19 to 21.

A designed cover 10D according to this embodiment is provided with only a single irradiation hole 15 for spot illumination in its center portion. A light guide 70 is shaped like a prism as shown in FIG. 20, and includes: two flat-surface-shaped light incident surfaces 71, which form an angle, in its rear; and a curved light emitting surface 75 in its front. The light guide 70 is configured to divide a light beam S incident on the light incident surfaces 71 in its rear from the light source unit 20 to two directions, and thus to emit the resultant two light beams diagonally through the single irradiation hole 15 in different directions. The rest of the configuration of the light source unit 20 and the like is the same as that of the first embodiment.

Since the prism-shaped light guide 70 is provided in this embodiment, the spotlight beams S can illuminate the different directions through the single irradiation hole 15 provided in the designed cover 10D. This makes it possible to reduce the number of light source units 20, and accordingly to reduce the weight and costs. Further, the reduction in the number of wirings enables this system to be easily assembled, and to save the space.

Moreover, because one light beam from the common light source unit 20 is divided into the two spotlight beams S by the prism-shaped light guide 70, it is possible to reduce unevenness in color and illuminance of the illuminated light beams, which would otherwise occur due to product variations of LEDs themselves as light sources of the light source unit 20.

Note that, for example, when a low-cost blue LED is used, if a fluorescent agent for changing the hue of light from the light source unit 20 is contained in the light guides 50, 60, 70 and 80 in the above embodiments, blue light can be changed into white light by the fluorescent agent contained in the light guides 50, 60, 70 and 80. This makes it possible to reduce the costs.

The first, the second and the third embodiments show the case where at least one of two types of illuminators (the irradiation hole 15 and designed unit 11) is provided in each of the designed covers 10, 10B and 10C so that the light beam from the light source unit 20 can be divided by each of the light guides 50, 60 and 80 into the two directions. Instead, the light beam may be divided by each of the light guides 50, 60 and 80 into three or more directions so that the light beam can be supplied to three or more illuminators. Similarly, in the fourth embodiment, the light beam from the light source 20 may be divided into three or more directions.

The entire contents of Japanese Patent Application P2007-323218 (filed on Dec. 14, 2007) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A vehicle interior lighting system comprising:
a cover attached to a ceiling wall in an inside of a vehicle compartment; and
a light source unit arranged between the cover and the ceiling wall,
wherein a light beam emitted from an emission port of the light source unit is emitted in a direction away from the ceiling wall and illuminates the inside of the vehicle compartment through a plurality of illuminators provided in the cover; and
a light guide is arranged between the emission port of the light source unit and the plurality of illuminators in the cover, the light guide being configured to divide the light beam emitted from the emission port of the light source unit into a plurality of light beams which travel in different directions and thereby to guide the light beams thus divided to the respective plurality of illuminators, wherein
as the plurality of illuminators, the cover is provided with a plurality of irradiation holes for spot illumination, through which small areas away from each other are respectively illuminated;
the light source unit is arranged in a location directly behind one irradiation hole among the plurality of irradiation holes; and
the light guide comprises:
a light incident surface configured so that the light beam emitted from the emission port of the light source unit is incident thereon;

a light dividing unit configured to divide the light beam incident on the light incident surface into the plurality of light beams which travel in the different directions, the number of the different directions corresponding to the number of the irradiation holes;

a first light emitting surface configured to emit one light beam toward the one irradiation hole located directly in front of the light source unit, the one light beam being one of the light beams which have been divided by the light dividing unit and thus traveling in one direction;

an arm configured to guide the other light beams respectively toward the other irradiation holes, the other light beams being the other of the light beams which have been divided by the light dividing unit and thus traveling in the other directions, respectively;

a second light emitting surface provided on the end portion of the arm so as to correspond to the other irradiation holes, and thereby configured to emit the light beams having come to the second light emitting surface through the arm toward the other irradiation holes, respectively; and each of the first and the second light emitting surfaces is arranged in a state such that the light beam from the first and the second light emitting surface is emitted in a direction away from the ceiling wall.

2. The vehicle interior lighting system according to claim 1, wherein as a light source, an LED is provided in the light source unit; and a fluorescent agent for changing a hue of light from the LED is contained in the light guide.

3. A vehicle interior lighting system comprising:

a cover attached to a ceiling wall in an inside of a vehicle compartment; and a light source unit arranged between the cover and the ceiling wall, wherein a light beam emitted from an emission port of the light source unit is emitted in a direction away from the ceiling wall and illuminates the inside of the vehicle compartment through a plurality of illuminators provided in the cover; and a light guide is arranged between the emission port of the light source unit and the plurality of illuminators in the cover, the light guide being configured to divide the light beam emitted from the emission port of the light source unit into a plurality of light beams which travel in different directions and thereby to guide the light beams thus divided to the respective plurality of illuminators, wherein as the plurality of illuminators, the cover is provided with:

an irradiation hole for spot illumination, through which a small area is illuminated;

a surface-shaped illuminator configured to emit light in a shape of a plane;

the light source unit is arranged in a location directly behind the irradiation hole for spot illumination; and the light guide comprises:

a light incident surface configured so that the light beam emitted from the emission port of the light source unit is incident thereon;

a light dividing unit configured to divide the light beam incident on the light incident surface into two light beams;

a first light emitting surface configured to emit one of the two light beams having divided by the light dividing unit toward the irradiation hole;

an arm configured to guide the other of the two light beams having divided by the light dividing unit toward the surface-shaped illuminator;

a second light emitting surface provided in the arm so as to correspond to the surface-shaped illuminator, and thereby configured to emit the light beam having come to the second light emitting surface toward the surface-shaped illuminator in the shape of a plane; and each of the first and the second light emitting surfaces is arranged in a state where the light beam from the first and the second light emitting surface is emitted in a direction away from the ceiling wall.

4. The vehicle interior lighting system according to claim 3, wherein as a light source, an LED is provided in the light source unit; and a fluorescent agent for changing a hue of light from the LED is contained in the light guide.

* * * * *